Oct. 17, 1933.  F. T. WING  1,930,917
SAFETY DEVICE FOR CROSS ROADS AND HILLS
Filed Nov. 7, 1932
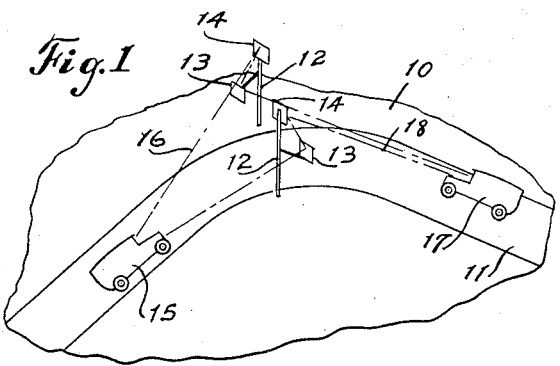
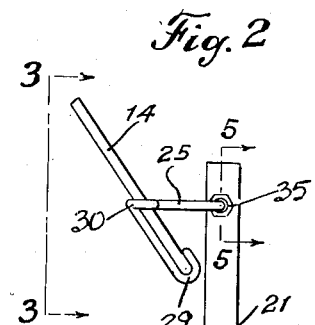
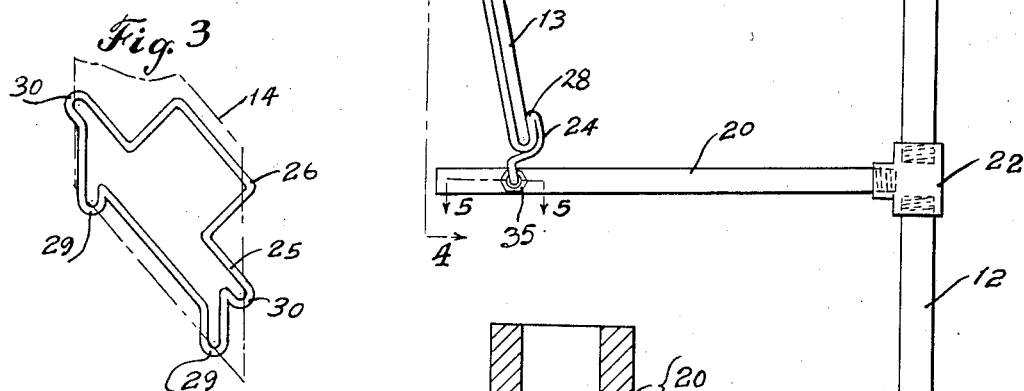
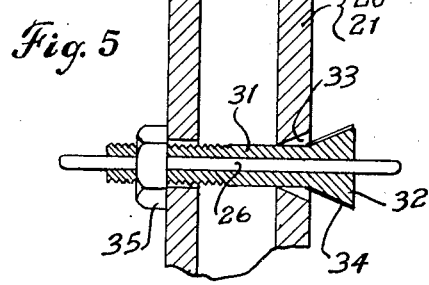
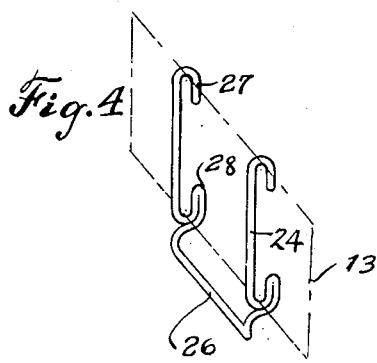
INVENTOR-
FREDERICK T. WING
BY
ATTORNEY- Patented Oct. 17, 1933

1,930,917

UNITED STATES PATENT OFFICE 1,930,917

SAFETY DEVICE FOR CROSS ROADS AND HILLS

Frederick T. Wing, Lincoln, Nebr.

Application November 7, 1932. Serial No. 641,601

6 Claims. (Cl. 88—1)

This invention relates to new and useful improvements in a safety device for curved roads, cross roads and hills.

The invention has for an object the construction of a safety device which is adapted to extend one's vision around cross roads or bent roads or over the tops of hills. The loss of property and lives by collisions at the points just mentioned is very large and the present device is calculated to reduce if not to entirely eliminate such accidents.

The invention particularly proposes the arrangement of a safety device adapted for location on the side of a road either upon the top of a hill or at crossings and provided with reflecting surfaces arranged so that the view is extended over the hill to the other side or around the cross road or curved road.

As a still further object of this invention it is proposed to build the support portion of the safety device from standard pipes arranged so as to allow adjustments in certain ways due to the threaded connections of the pipe sections.

A still further and more important object of this invention is the provision of mirrors or other reflecting devices and supporting frames with straight sections extending through said support and an arrangement associated with said straight sections for holding said mirrors or other devices, at proper angular positions to reflect as desired.

Still further the invention contemplates the provision of means for locking the straight sections against rotation upon slight longitudinal motion thereof; and further the provision of means for securely holding the straight sections in said moved condition to insure maintenance of the locking position.

Furthermore the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a fragmentary perspective schematic view of a portion of a hill with a road equipped with safety devices according to this invention.

Fig. 2 is a side elevational view of one of the safety devices according to this invention.

Fig. 3 is a perspective view of one type of mirror supporting frame used in the device.

Fig. 4 is a perspective view of another type of mirror supporting frame used in the device.

Fig. 5 is a fragmentary enlarged sectional view taken on either of the lines 5—5 of Fig. 2.

The reference numeral 10 indicates generally a hill provided with a road 11 extended over the top so that vehicles on opposite sides cannot see the road immediately ahead. While a hill road has been illustrated to explain the invention it should be recognized that the invention may be applied to a curved road or a crossing. At the critical point of the road 11, that is at the top of the hill, and if the road crosses another road or if it has a bend at the crossing point or bend, there is located a pair of safety devices according to this invention mounted on opposite sides of the road, and each consisting of a support 12, carrying mirrors 13 and 14. A vehicle 15 is shown on one side of the road and the dot and dash lines 16 indicate the line of vision of the vehicle driver to the other side of the road. Similarly on the other side of the road there is shown a vehicle 17 and the dot and dash lines 18 show the line of vision of the vehicle driver using the other of the pair of safety devices.

In Fig. 2 one of the safety devices has been shown in detail and the member or support 12 comprises a plurality of pipes suitably joined together by pipe fittings and arranged so as to have a horizontal arm 20 and a top vertical arm 21 connected respectively at right angles to each other in a suitabe T connection 22. The pipe sections 20 and 21 are of smaller diameter than the pipe sections which support these parts since such construction is good engineering, that is, the making of the lower portion of a structure much stronger than the upper portion. The base of the member or support 12 comprises a foot 23 secured at the bottom of the support and adapted to be imbedded in a concrete or other type of foundation.

Mirror supporting frames 24 and 25 for holding the mirrors 13 and 14 respectively, are adjustably mounted near the ends of the pipe sections 20 and 21. The mirror supporting frame 24 comprises a horizontal straight section 26 adapted to engage transversely through the pipe section 20 and from which there projects a pair of support arms, each arm being provided with opposed hooks 27 and 28 adapted to engage the top and bottom edges of the mirror for securely holding the mirror in place. In Fig. 4 dot and dash lines indicate the mirror 13 schematically. The frame 25, while different from the frame 24, has one feature identical and that is, that it is provided with a straight section 26 for engaging transversely through the pipe section 21 and from which the remaining portions of the frame extend. In this particular frame there are bent loops 29 at the bottom adapted to receive the bottom edge of the mirror and side loops 30 to engage against the sides of the mirror. The dot and dash lines in Fig. 3 indicate the mirror 14. It should be noticed that the mirror should be slipped in from the top so that its sides engage the loops 30 while its bottom rests against the loops 29.

A means is provided for locking each of the frames in various angular positions about the straight section 26. This locking means is necessary in that then the mirrors may be properly set for correct reflecting to show the road clearly. Said locking means comprises a tubular member 31 riveted, soldered, or in any other manner fixed permanently upon the straight section 26 and extending through the member or support 20 or 21 as the case may be. At one end the tubular member 31 is formed with a tapered enlargement 32 outside of the member or support for engaging against a complementary recess 33 in the member or support in a manner so as to frictionally hold and prevent rotation of the tubular member. Preferably the outer face of the tapered enlargement 32 should be formed with serrations or ribs 34 to better grip the inner face of the complementary recess 33. This complementary recess can also be formed with serrations or any other types of roughness.

A nut 35 threadedly engages upon the other end of the tubular member 31 and is adapted to abut against the member or support so as to draw and tightly clamp the tapered enlargement 32 in its recess 33. In Fig. 5 the tubular member 31 is shown in its disengaged position in which the frame is free to be rotated about the straight section 26 as the center of rotation. To lock the frame in any rotative position it is merely necessary to turn the nut 35 further up on the tubular member to cause the tapered enlargement to engage the complementary recess.

In use the safety devices are mounted upon the sides of the road. The frames must be suitably adjusted to properly reflect in the direction desired. Pivotal adjustments of the frames are accomplished by loosening the nuts 35, then adjusting the frames, and next tightening the nuts 35. Horizontal adjustments are accomplished by turning the support sections 20 and 21.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. In a safety device for cross roads, curved roads and roads over hills, a member for location on the sides of the cross roads, curved roads or roads over the hill, a mirror supporting frame for holding a mirror to cooperate with another mirror to reflect over the hill or around the roads or cross roads, including a straight section extending through said member, means for locking the frame in various angular positions about the axis of said straight section, comprising means for locking said straight section against rotation upon slight motion along its length, and means for holding said straight section in its moved position.

2. In a safety device for cross roads, curved roads and roads over hills, a member for location on the sides of the cross roads, curved roads or roads over the hill, a mirror supporting frame for holding a mirror to cooperate with another mirror to reflect over the hill or around the roads or cross roads, including a straight section extending through said member, means for locking the frame in various angular positions about the axis of said straight section, comprising a tubular element fixed upon said straight section and extending through said member and having a tapered enlargement at one end outside of the member engageable against a complementary recess in the member to frictionally prevent rotation of said straight section, and a nut threadedly engaging on the other end of said tubular element and abutting against the other side of said member to clamp the tubular element in its locked position.

3. In a safety device for cross roads, curved roads and roads over hills, a member for location on the sides of the cross roads, curved roads or roads over the hill, a mirror supporting frame for holding a mirror to cooperate with another mirror to reflect over the hill or around the roads or cross roads, including a straight section extending through said member, means for locking the frame in various angular positions about the axis of said straight section, comprising a tubular element fixed upon said straight section and extending through said member and having a tapered enlargement at one end outside of the member engageable against a complementary recess in the member to frictionally prevent rotation of said straight section, and a nut threadedly engaging on the other end of said tubular element and abutting against the other side of said member to clamp the tubular element in its locked position, said tapered enlargement being formed with serrations upon its tapered face to engage against said complementary recess.

4. In a safety device for cross roads, curved roads and roads over hills, a member for location on the sides of the cross roads, curved roads or roads over the hill, a mirror supporting frame for holding a mirror to cooperate with another mirror to reflect over the hill or around the roads or cross roads, including a straight section extending through said member, means for locking the frame in various angular positions about the axis of said straight section, comprising a tubular element fixed upon said straight section and extending through said member and having a tapered enlargement at one end outside of the member engageable against a complementary recess in the member to frictionally prevent rotation of said straight section, and a nut threadedly engaging on the other end of said tubular element and abutting against the other side of said member to clamp the tubular element in its locked position, said member including sections threadedly supported and carrying said frame allowing rotative adjustments of said threaded sections to adjust the position of said frame.

5. In a safety device for cross roads, curved roads and roads over hills, a member for location on the sides of the cross roads, curved roads or roads over the hill, a mirror supporting frame for holding a mirror to cooperate with another mirror to reflect over the hill or around the roads or cross roads, including a straight section extending through said member, means for locking the frame in various angular positions about the axis of said straight section, comprising means for locking said straight section against rotation upon slight motion along its length, and means for holding said straight section in its moved position, said means for locking said straight section upon motion along its length comprising an element fixedly mounted upon said straight section and adapted to clamp against a portion of said member when the straight section is moved into its locking position.

6. In a safety device for cross roads, curved roads and roads over hills, a member for location on the sides of the cross roads, curved roads or roads over the hill, a mirror supporting frame for holding a mirror to cooperate with another mirror to reflect over the hill or around the roads or cross roads, including a straight section extending through said member, means for locking the frame in various angular positions about the axis of said straight section, comprising means for locking said straight section against rotation upon slight motion along its length, and means for holding said straight section in its moved position, said means for locking said straight section upon motion along its length comprising an element fixedly mounted upon said straight section and adapted to clamp against a portion of said member when the straight section is moved into its locking position, and said means for holding the straight section in the moved position comprising a nut threadedly engaged upon said element and adapted to abut against a stationary part of said member.

FREDERICK T. WING.